United States Patent [19]
Gass et al.

[11] 4,162,526
[45] Jul. 24, 1979

[54] FAILSAFE PRIMARY POWER CONTROL APPARATUS FOR SYSTEMS USING COMPUTER CONTROLLED POWER SEQUENCING

[75] Inventors: Albert E. Gass; Harry W. Gottshall, both of Poughkeepsie; Manfred O. Schaber, Hyde Park; Lawrence Trombino, Pleasant Valley, all of N.Y.

[73] Assignee: International Business Machines Corporation, Armonk, N.Y.

[21] Appl. No.: 887,090

[22] Filed: Mar. 16, 1978

[51] Int. Cl.² .............................................. G06F 11/00
[52] U.S. Cl. .................................................... 364/200
[58] Field of Search ... 364/200 MS File, 900 MS File; 235/301, 303, 303.1; 340/635, 657, 660, 663; 361/88, 93

[56] References Cited
U.S. PATENT DOCUMENTS

| 3,890,494 | 6/1975 | Meshek | 235/301 |
| 4,020,472 | 4/1977 | Bennett | 364/200 |

*Primary Examiner*—James D. Thomas
*Attorney, Agent, or Firm*—Harold H. Sweeney, Jr.

[57] ABSTRACT

Failsafe primary power control apparatus is provided which includes a backside contact of a control relay in series with the power relay which is held open until the initial program load and latch reset is finished. The system also includes a timer which is initiated by a power fault condition signal which is simultaneously applied to the processor. If the processor is capable of handling the fault condition, it puts out a signal which stops the timer. If the processor is not capable of handling the fault, the signal to the timer is not produced and, accordingly, the timer runs the full interval. This causes the backside contact of the control relay to open thus deenergizing the power relay and removing the power from the entire system.

8 Claims, 4 Drawing Figures

FAILSAFE PRIMARY POWER CONTROL APPARATUS FOR SYSTEMS USING COMPUTER CONTROLLED POWER SEQUENCING

DESCRIPTION

1. Technical Field

This invention relates to failsafe apparatus for primary power control in systems using computer controlled power sequencing, and more particularly, to apparatus providing positive exclusion of extraneous power element activation prior to initial program load and reset and positive removal of power in the event of computer failure to respond to a detected fault.

It is the primary object of the present invention to provide failsafe apparatus for primary power control in systems using computer controlled power sequencing.

It is another object of the present invention to provide failsafe apparatus for positive exclusion of extraneous power element activation prior to the initial program load and reset.

It is a further object of the present invention to provide failsafe apparatus for positive removal of power in the event of computer failure to respond to a detected fault.

It is another object of the invention to provide failsafe apparatus for primary power control in a system in which the entire computer is available for processing unless a power fault is detected in the system.

2. Background Art

It would appear from an examination of the prior art, that this is the first time that power control has been placed under the control of the processor in the system in which the power is being utilized. Systems using processors, especially process control systems have found it necessary to include some means of determining the operability of the processor and to provide a means of alerting the system or an operator that the processor is inoperative. For example, U. S. Pat. No. 3,919,533, issued Nov. 11, 1975 provides apparatus for indicating faults in the operation of apparatus which is continuously monitored. When the apparatus monitored is functioning properly, a coded output signal is periodically generated. The coded output is decoded and a signal is generated which resets a timer before it runs its full interval, thereby, inhibiting a fault output during the active interval of the timer. The absence of the signal generated by the apparatus being monitored would allow the timer to run its full interval, thereby, producing a fault indication in the form of an alarm, etc. It will be appreciated that this apparatus requires a continuous operation of the processor to continuously provide the timer reset signals. Such a continuous system would be very wasteful of processing time if it were utilized in conjunction with a power fault arrangement. The power faults may be few and far between in a processing system and, thus, an interrupt driven system is preferable since the processing time is only utilized when the interrupt due to a power fault is present. Accordingly, the failsafe primary power control apparatus of this invention is only initiated when a power fault exists.

The main advantage of the apparatus of the present invention is that it does not employ a continuous monitoring of the apparatus but is responsive to a power fault detection which applies an interrupt to the apparatus being monitored which initiates an operational check. Thus, the apparatus such as the processor is free to carry out its function unless a power fault is detected.

BRIEF DESCRIPTION OF THE DRAWINGS

In the accompanying drawings forming a material part of this disclosure.

DISCLOSURE OF INVENTION

For further comprehension of the invention, and of the objects and advantages thereof, reference will be had to the following description and accompanying drawings, and to the appended claims in which the various novel features of the invention are more particularly set forth.

Figure 1:
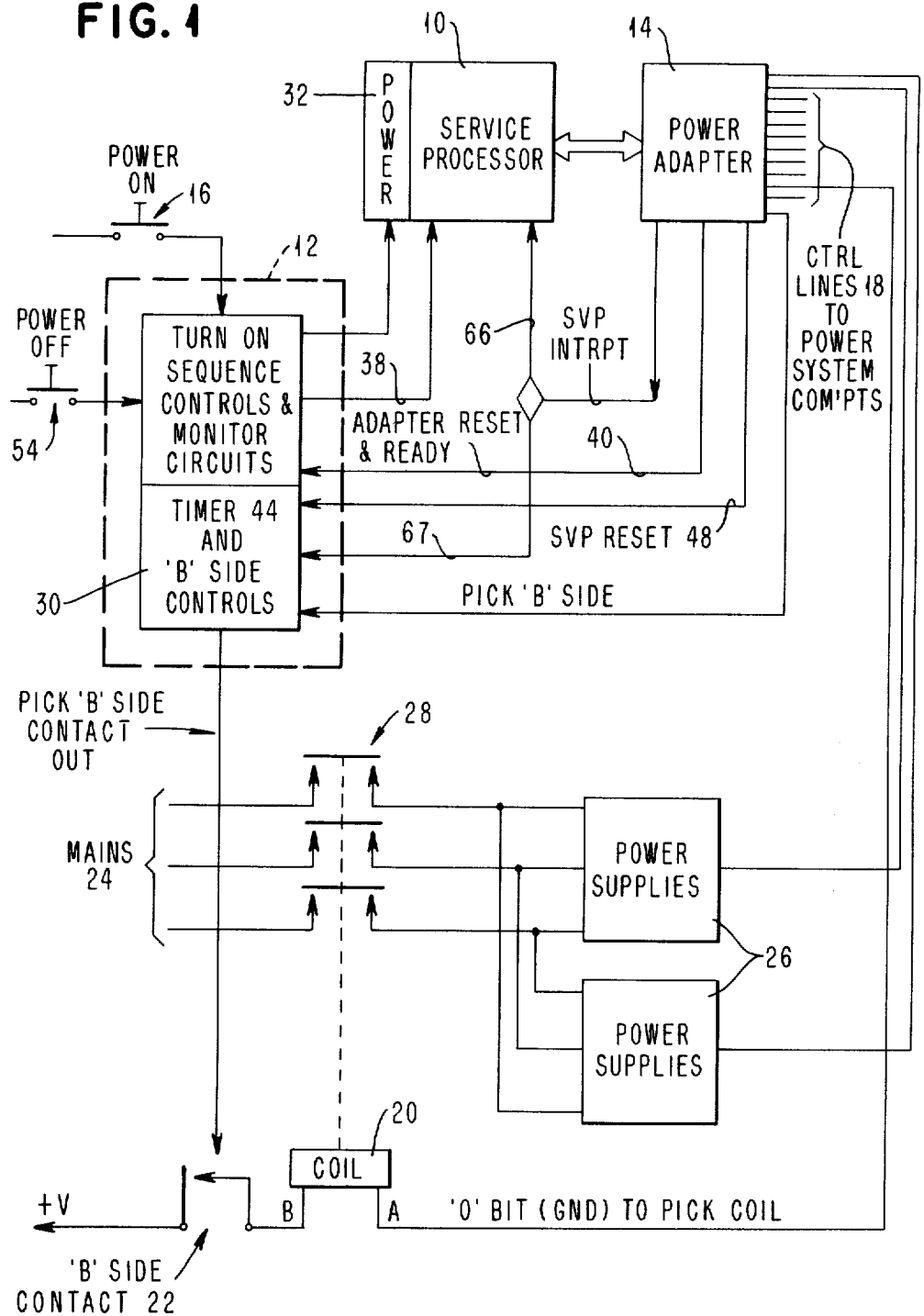
FIG. 1 is a simplified block diagram showing the primary power control apparatus in a processor controlled system.

The means for controlling the primary power in a computer controlled system can best be appreciated from a description of the primary power control system shown in the block diagram of FIG. 1.

When using a processor as the controlling element in a power system, it should be noted that at the time of voltage application to the processor undesired bit patterns may be presented to the power adapter. The power adapter is the interface between the processor and the reset of the system. This condition could cause the power element driven by the adapter to assume its active state resulting in uncontrollled system power application and potential safety hazards. It should also be kept in mind that if the processor, software, or one of its dependent peripherals fail once the system has attained its power-on state, system power-off must be accomplished by some other, extraordinary, means.

Referring to FIG. 1, there is shown a primary power control apparatus for a computer controlled system. The processor 10 can be any interrupt driven processor such as a 6800 or 8080 processor.

In the failsafe apparatus for primary power control, the Initial Power Controls IPC 12 turns on power to activate the processor 10 and the power adapter 14 upon depression of the power-on push-button 16.

During the transitional stages of power-off to power-on the control lines 18 to the power system components may assume their active state thereby conditioning the "A" side of coil 20. If "B" side contact 22 were not existent, power mains 24 would be applied to system power supplies 26 in an uncontrolled manner via coil contacts 28.

When the IPC 12 senses that all voltages required by the processor 10 and power adapter 14 are present and that the processor has successfully loaded its program and has issued reset commands to the power adapter, the "B" side controls 30 close the "B" side contact 22 allowing control of coil 20 by the processor 10 via the adapter 14.

Once the entire system has been powered up, the IPC 12 monitors the status of processor power 32 and upon detecting a fault, starts timer 44. The timer 44 is also started by the detection of faults in other parts of the power system. This results in an interrupt being sent to the processor which simultaneously starts the timer. If the fault has not impaired the capability of the processor 10, the processor will issue a reset to the timer 44, before the timer times out. This is a repetitive process until the fault is cleared, or the processor 10 removes system power in an orderly fashion.

Should the processing capability of the processor 10 be impaired by the detected fault, the timer reset signal on the SVP reset line 48 will not be presented to the timer 44 and the timer will be allowed to run its full interval, thereby dropping the "B" side contact 22 removing all system power 26 by opening contacts 28 via coil 20.

Figure 2:
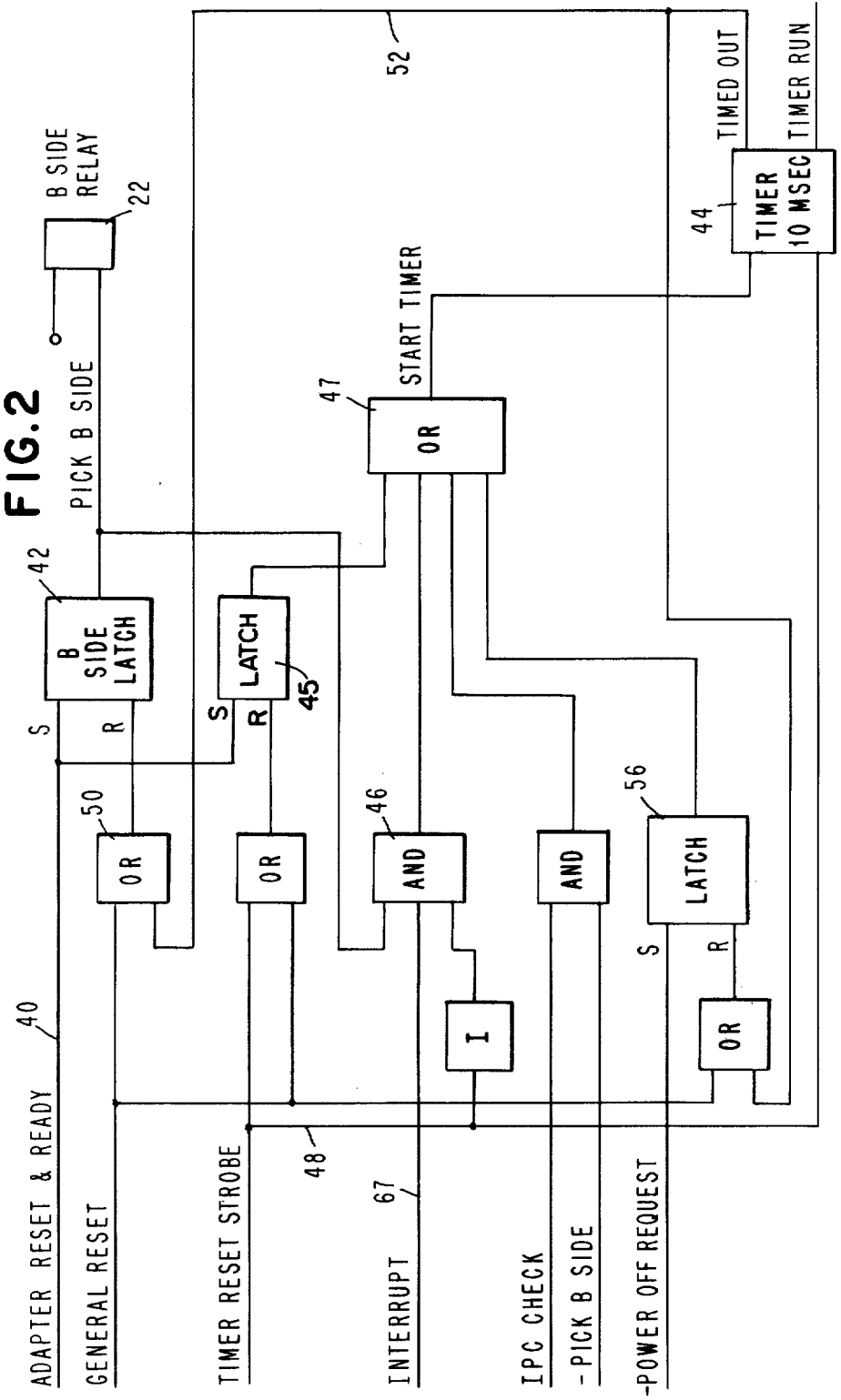
FIG. 2 is a block diagram showing further details of the timer and "B" side controls block of FIG. 1.

When power-on push-button 16 is depressed (FIG. 1) the power sequence and control portion of the IPC 12 and the power supplies 32 are turned on. When the IPC 12 senses that all required voltage levels are present, it signals the processor 10 that power is good via connection 38. Upon receipt of the power good signal, the processor begins to load its non-resident microcode program. One of the first steps performed by the processor is to reset all adapter latches to a known, predetermined state. When this reset is complete, a signal is sent from the processor 10, via the adapter 14, to the IPC 12 indicating that the adapter is reset and ready. The adapter reset and ready signal is received in the IPC 12 on line 40, FIG. 2. This signal causes "B" side latch 42 to latch and allows the "B" side relay 22 to pick or be energized. It also starts the timer 44 via latch circuit 45 and OR circuit 47. If, within 10 milliseconds a timer reset strobe is not issued by the processor on the line 48, the timer 44 will run out and the "timed out" signal will be generated by the timer and sent to OR circuit 50 via line 52. The output of OR circuit 50 will reset the "B" side latch 42, dropping the "B" side relay 22 and, thus, dropping all power elements under control of the adapter 14 and processor 10.

If the timer reset strobe on line 48 is received by the timer 44 before the timer times out, the "B" side relay will not be dropped and the power elements controlled by the processor and adapter will sequence up normally under software control and the IPC 12 will assume a monitor function. In this mode, it is expected that all power elements activated by the processor 10 via the adapter 14 will be monitored by the processor. Any power element fault either in the power elements controlled by the processor or in the power supporting the processor will generate an interrupt signal that is sent to both the processor 10 and the IPC timer start via the AND circuit 46 and OR circuit 47. This starts the timer 44 which must be reset by the processor before timing out in 10 milliseconds. This process ensures that, with any power element fault the processor must be capable of processing the power interrrupt and generating the timer reset strobe signal. If it cannot, for reasons such as, processor/adapter support power faults, impaired software or processor/adapter hardware logic faults, all power elements in the system will be shut off due to the timed out signal resetting the "B" side latch 42 and dropping the "B" side relay 22.

Similarly, the depression of the power-off push-button 54 will set the power-off latch 56 and start the timer 44 via OR circuit 47. As long as the processor 10 is capable of resetting the timer, it may, in increments of less than 10 milliseconds, perform an orderly shut-down of all power elements under microcode control. If as previously described, the processor/adapter is impaired, the timer 44 will time out dropping "B" side relay 22, thereby, removing all system power at the end of the timer 10 millisecond duration.

Figure 3:
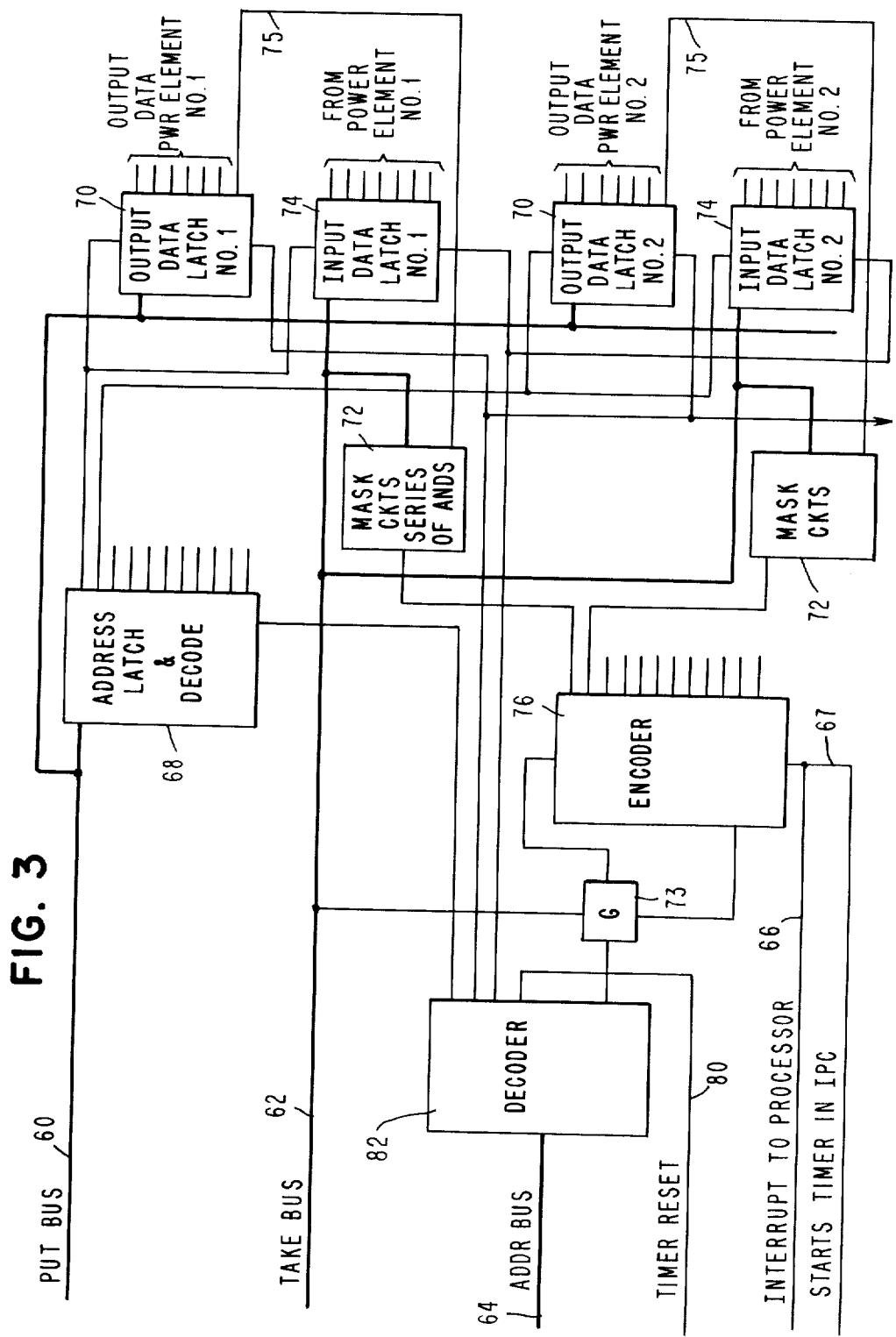
FIG. 3 is a block diagram showing further details of the power adapter block of FIG. 1.
Figure 4:
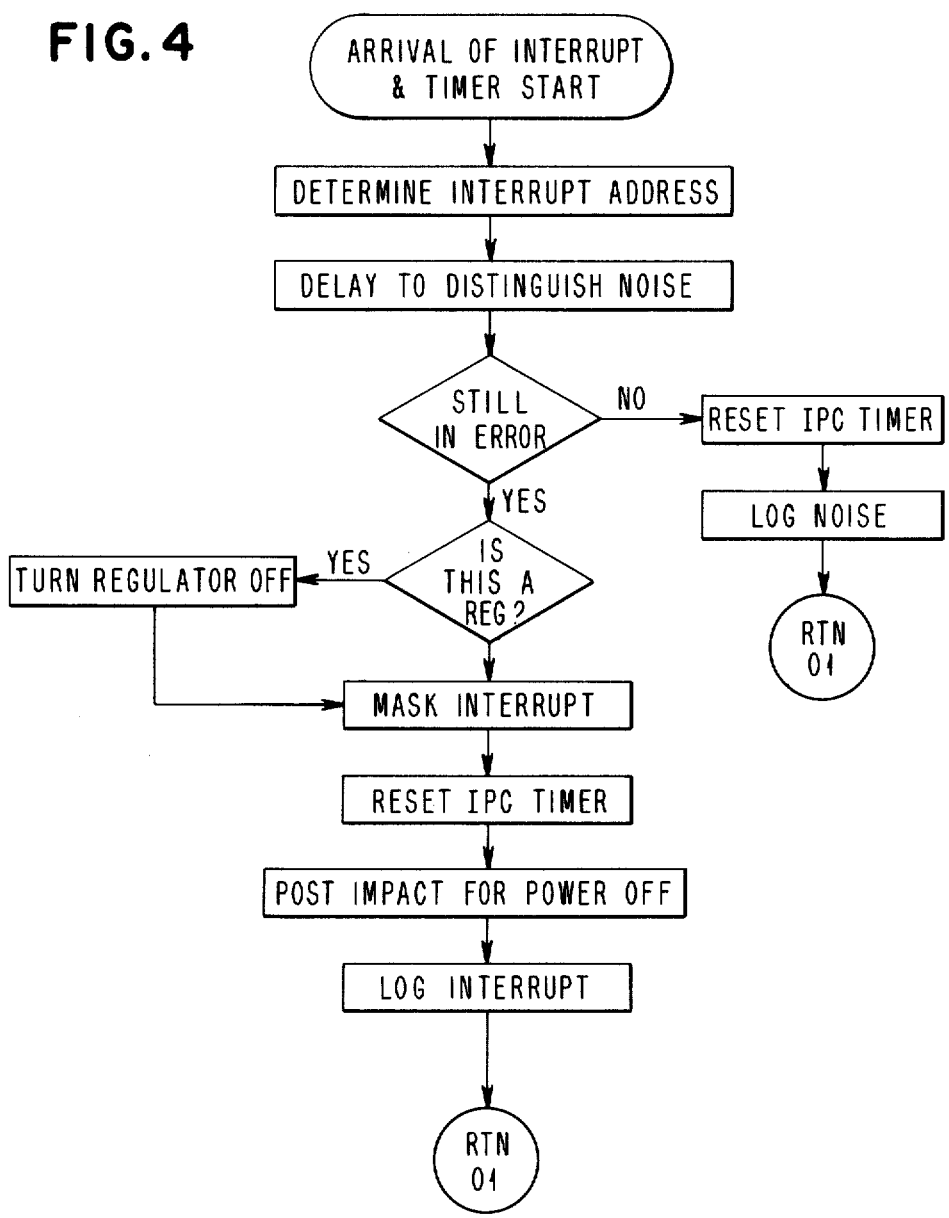
FIG. 4 is a flow diagram indicating the programming steps for controlling the power adapter and the timer and "B" side controls of FIGS. 3 and 2 respectively in response to an interrupt.

The power adapter 14 is shown in further detail in the block diagram of FIG. 3. Data to and from the processor 10 is by means of the put and take buses 60 and 62, respectively, along with the address bus 64, which identifies what type of data is being sent or received. The data can be address data or information data being sent to or received from the power elements. In this embodiment a separate bus is shown for the put data (data from the computer to the adapter) and for the take data (data from the adapter to the computer). It should be noted that the same principle of operation applies to bi-directional buses, that is, one bus for both input and output data. The interrupt line 66 is used as a signal from the adapter to the processor 10 that some action is needed by the adapter. This same interrupt signal starts the timer 44 in the IPC 12 via the interrupt line 67 through AND circuit 46 and OR circuit 47 (See FIG. 2).

In order to send data to a particular power element, two steps are required. The first step is to send the power element address on the put bus 60 with the appropriate data identification on the address bus 64. The power element address is stored in the address latch 68 after this operation. The next step is to send the desired information on the put bus 60 once again with the appropriate data identification on the address bus 64. This data may be information for turning on and off power regulators, contactors, etc., depending on what is connected to the selected output lines of the selected output data latch 70. The information data also consists of masking data, which is sent through the appropriate data latch 70 to the masking circuit 72 via line 75, for determining whether or not an interrupt from this address is desired. The masking circuits 72 consist of a series of AND circuits which receive a fault indication on the take bus 62 from the appropriate input latch 74. If the signal data on line 75 indicates an interrupt is desired then the masking circuit generates an output which is connected to encoder 76.

Encoder 76 is a priority encoder which accepts, for example, eight inputs and produces a binary weighted code of the highest order input. These priority encoders are well known and can be obtained as off the shelf items from companies selling electronic equipment. An example of such an encoder is shown on page 8-103 of the Fairchild Semiconductor TTL data book, June 1972 titled "Eight-Input Priority Encoder". The output of the encoder 76 is an interrupt signal on line 66 which interrupts the processor and line 67 which starts the timer 44 in the IPC 12.

Information coming in the other direction from the power element is gated thru the input data latch 74 onto the take bus 62 when the desired power element address is selected and the appropriate address is on the address bus 64. Any fault condition is sent as one input to the mask circuits 72, the other input is the mask data sent to this power adapter address by the processor via line 75. If a fault occurs and the interrupt is masked on, an active input to the priority encoder 76 will occur. The priority encoder 76 in turn generates an interrupt to the processor, starts the timer in the IPC, and encodes the address and makes it available on the take bus 62 when gated by the appropriate address on the address bus 64.

When an interrupt signal is received by the processor via line 66, the processor can determine the address which caused the interrupt by gating the output of the encoder 76 onto the take bus 62 thru gate 73. The processor 10 can now send this address on the put bus 60 to activate this power element address. Data from this power element address is now available on the take bus 62 providing the cause of the interrupt. Since the cause of the interrupt is known, the interrupt can be masked off, thus no longer keeping the IPC timer 44 running. However, the IPC timer 44 will continue to run until it is reset. The timer reset, on line 80, is one of the decoded outputs of the address bus decoder 82 thus, it is simply a case of sending the appropriate address and the timer 44 is reset. The decoder 82 is the opposite of the encoder 76. For example, it can essentially take three inputs in and decode into eight outputs. Accordingly, the appropriate address might be a 101 digital data combination which when decoded provides the timer reset signal on line 80 which resets the timer 44 via line 48 (see FIG. 2). The processor is now available to send the data to perform the necessary functions for the power fault. These functions may range from turning off the entire system for a serious power fault, to simply recording and displaying a message for say a tripped circuit breaker for a convenience outlet transformer.

In the event that the processor 10 itself was faulty and could not respond to the original interrupt, the timer 44 would continue to run until it timed out. At this time the "B" side controls would drop, removing all power from the system. Even though there are many steps to be performed by the processor before the timer is reset, these steps are done at processor speed which is very much faster than the timer.

FIG. 6 shows a flow diagram of the timer start and reset. The program starts upon the arrival of an interrupt and timer start signal. The first step is to determine the interrupt address followed by a delay to distinguish the interrupt from noise. If the interrupt does not persist, then the IPC timer is reset and the noise log is made. The program then returns to the start box. If the interrupt persists and the interrupt is caused by a regulator, then the regulator is turned off and the interrupt masked. Similarly if it is not a regulator, then the interrupt is masked and the IPC timer is reset. The next step is to post impact for power-off and log the interrupt. The flow returns to block 1 waiting the arrival of further interrupts.

While we have illustrated and described preferred embodiments of our invention, it is to be understood that we do not limit ourselves to the precise construction herein disclosed and the right is reserved to all changes and modifications coming within the scope of the invention as defined in the appended claims.

Having thus described my invention, what I claim as new, and desire to secure by Letters Patent is:

1. A failsafe primary power control apparatus for systems using computer controlled power sequencing comprising:
   means for supplying fault signals from the power elements of the power system indicative of detected power faults;
   means responsive to the fault signals from the power elements to provide an interrupt signal;
   processor means responsive to said interrupt signal for supplying an encoded signal when the processor is operable;
   decoder means responsive to said encoded signal to provide a decoded timer reset signal;
   a timer having a preset time interval started in response to said interrupt signal and providing a power-off signal upon running a full time interval and responsive to said decoded timer reset signal for stopping the timer before running a full interval and resetting the timer to the beggining of the preset time interval;
   means responsive to said power-off signal for removing power from said power elements.

2. A failsafe primary power control apparatus according to claim 1, wherein said means for supplying fault signals from the power elements of the power system includes a transmission line and a latch for each power element, the latch responding to a fault signal from the corresponding power element.

3. A failsafe primary power control apparatus according to claim 1, wherein said means responsive to the fault signals includes masking circuits responsive to masking data from said processor means for selectively inhibiting said fault signals.

4. A failsafe primary power control apparatus according to claim 1, wherein said means responsive to the fault signals includes a priority encoder for producing the interrupt signal from the highest priority fault signal.

5. A failsafe primary control apparatus according to claim 1, wherein said processor means responsive to said interrupt signal generates address and data information.

6. A failsafe primary control apparatus according to claim 3, wherein said masking circuits are AND circuits responsive to the masking data information from said processor means and said fault signals for selectively inhibiting said fault signals.

7. A failsafe primary power control apparatus according to claim 1, wherein said encoded signal is predetermined digital information.

8. A failsafe primary power control apparatus according to claim 1, wherein said means for removing power from said power elements includes a power relay and an auxiliary relay having a pair of contacts in series with said power relay and arranged to open in response to said power-off signal thereby providing power shutoff.

* * * * *